Nov. 20, 1956  F. D. OTT  2,771,207
CLINCH NUT SPINNING TOOL
Filed May 20, 1954
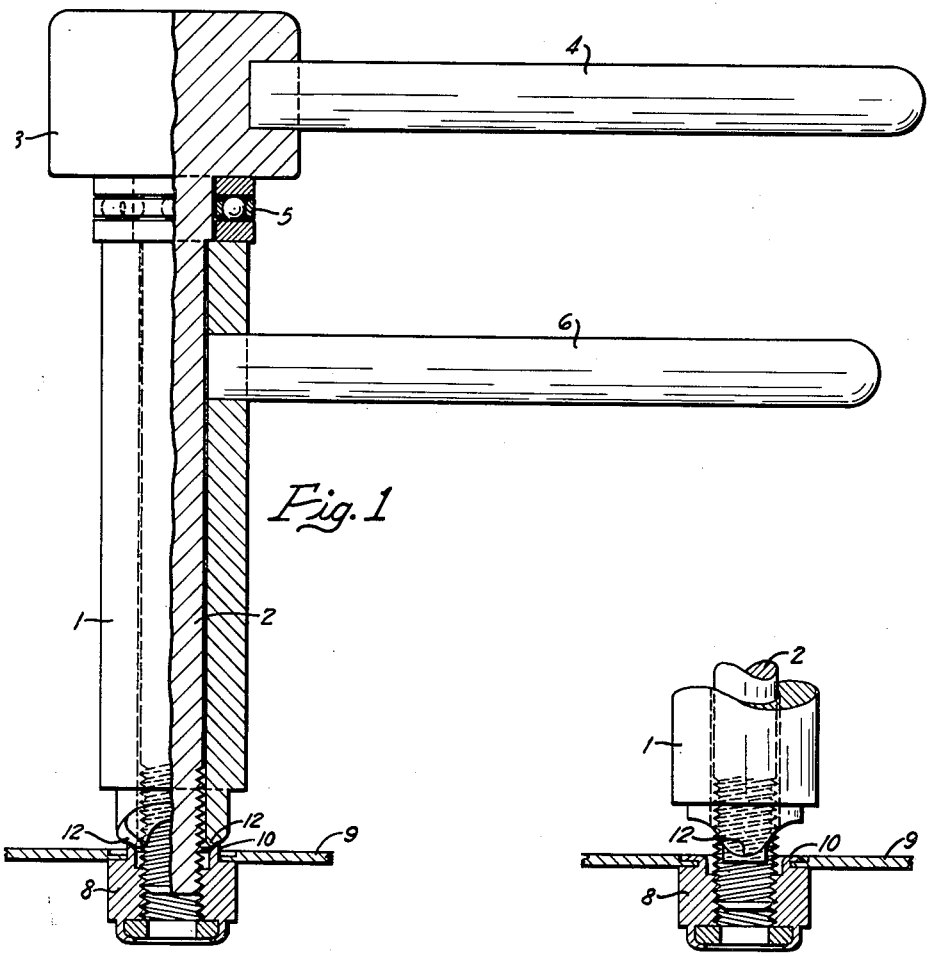
INVENTOR.
FRED D. OTT
BY
Brown, Critchlow, Flick & Peckham
HIS ATTORNEY United States Patent Office 2,771,207
Patented Nov. 20, 1956

2,771,207
CLINCH NUT SPINNING TOOL

Fred D. Ott, Boalsburg, Pa., assignor, by mesne assignments, to the United States of America as represented by the Secretary of the Navy Application May 20, 1954, Serial No. 431,070

1 Claim. (Cl. 218—38)

This invention relates to spinning tools for fastening internally threaded elements, such a clinch nuts, to supports.

It is among the objects of this invention to provide such a tool which has a simple construction, which is easy to operate, which requires no back-up tool, and which exerts a much greater pressure against the threaded element for a given application of force to the tool than heretofore.

In accordance with this invention, the spinning tool has a sleeve with a tapered front end provided with circumferentially spaced areas that are shaped to bear against the inner edge of an upstanding circular flange at one end of an internally threaded element. Rotatably mounted in the sleeve is a rod that has a threaded end projecting from the front end of the sleeve. A head is mounted on the opposite end of the rod for rotating it to screw the rod into the threaded element, whereby to force the spaced areas of the sleeve to expand correspondingly spaced areas of the flange. The sleeve is provided with means for then turning it around the rod to cause the front end of the sleeve to spin the flange outward. For best results, there are only two of the spaced areas at the front end of the sleeve and each is concave in a radial plane and convex in a plane perpendicular to the radial plane.

The preferred embodiment of the invention is illustrated in the accompanying drawings, in which:

Fig. 1 is a side view of the tool, partly in section, showing it when first attached to a clinch nut;

Fig. 2 is a fragmentary view similar to the preceding one, but with the sleeve turned 90° and in flange-clinching position;

Fig. 3 is a fragmentary view similar to Fig. 2, but with the sleeve turned 90°; and Fig. 4 is a view of the front end of the tool.

Referring to the drawings, a sleeve 1 has a rod 2 extending through it and projecting from its front end. The rear end of the rod behind the sleeve may be enlarged, if desired, and is joined to a head 3 of considerably larger diameter than the sleeve. The connection between rod and head is rigid, but need not be integral or permanent if it is wished to be able to substitute rods having front ends of different diameters. The head may be shaped for turning by a wrench, but preferably is provided with a radial hole in which a handle 4 is mounted. Between the head and sleeve there is a thrust bearing 5 of any suitable construction. The sleeve also is provided with a radial hole receiving a handle 6 for turning the sleeve around the rod.

The projecting front end of the rod is threaded so that it can be screwed into an internally threaded element, such as a clinch nut 8, which it is desired to fasten to a metal plate 9. The inner or upper end of the passage through the nut is encircled by an upstanding circular clinch flange 10 in a well known manner, which fits snugly in a preformed hole in the plate. The outer diameter of the upstanding flange is less than that of the body of the nut so that the flange can be flared out over the portion of the plate that the body engages to lock the nut and plate together.

To flare the nut flange 10, the front end of the sleeve is tapered so that it will bear against the inner edge of the flange, but it is shaped so that only circumferentially spaced areas engage the flange. For this purpose, the front end of the sleeve has circumferentially spaced projections 12, preferably only two, disposed at diametrically opposite points. Most suitably, the front portion of the sleeve, on which the projections are formed, is reduced in diameter so that it will not strike the plate before the nut is clinched in place and prevent proper clinching, as in the case where the flange is to be countersunk below the surface of the plate. The end surface of each projection is rounded or convex when viewed in a direction radial to the sleeve, as shown in Fig. 2, but the end surface also is inclined forward and inward and preferably is slightly concave in a radial plane. This is shown in Fig. 1. The preferred shape of the projections can be obtained by first tapering the end of the sleeve and then grinding away opposite sides of the reduced portion with a cylindrical tool, followed by rounding each projection to give it the shape shown in Fig. 2.

In using this spinning tool the nut 8 or similar element is first placed against one side of plate 9 with upstanding clinch flange 10 extending there through. The spinning tool on the side of the plate opposite to the nut then is moved forward and the threaded end of rod 2 is screwed into the nut until the projections 12 at the front end of the sleeve engage the nut flange. Then, while handle 6 is held in one hand, handle 4 is rotated to forcefully screw the rod farther into the nut. Since the head 3 cannot move closer to the plate without also pushing the sleeve forward, the result is that the rounded ends of the projections are forced into flange 10 on opposite sides of the rod and expand or upset the portions of the flange that they engage. Handle 4 then is held stationary and handle 6 is rotated around the rod to cause the sleeve projections 12 to spin the flange outward over the plate. This initial spinning, flaring or belling operation can be followed as many times as necessary by a repetition of the screwing of the rod farther into the nut and then the turning of the sleeve, until the flange is pressed down tightly against the plate as shown in Figs. 2 and 3. The rod then can be unscrewed from the nut very easily, leaving the nut securely fastened to the plate.

The construction and operation of this spinning tool is of the simplest, yet it can apply great pressure to the element being clinched in place because the pressure is concentrated in the two small areas of engagement between projections 12 and flange 10. Since no back-up tool is used, nuts can be fastened in place in restricted areas that would not admit such a tool. The spinning tool is useful not only for fastening nuts and the like in place in the first instance, but also for correcting improperly assembled nuts and retightening them if they have become loose.

According to the provisions of the patent statutes, I have explained the principle of my invention and have illustrated and described what I now consider to represent its best embodiment. However, I desire to have it understood that, within the scope of the appended claim, the invention may be practiced otherwise than as specifically illustrated and described.

I claim:

A spinning tool for affixing an internally threaded element to a support which has a preformed hole to contain a circular flange projecting through the hole from said element; said tool consisting of a thread course to be screwed into the internal thread of said element, a handled rod of which the thread course is a part, said rod having a head, a handled sleeve revoluble on the rod and having one end thereof in bearing support confronting said head, and a forming structure at the other end of the sleeve, said structure comprising a diametrically opposed pair of convexly rounded projections the end surfaces of which are shaped to produce concavities therein and are inclined both forwardly and inwardly for engaging the inner edge of said flange to expand and upset said flange pursuant to turning of the rod and sleeve relative to said threaded element.

References Cited in the file of this patent

UNITED STATES PATENTS

| | | |
|---|---|---|
| 166,925 | Flagg | Aug. 24, 1875 |
| 498,277 | Lanagan | May 30, 1893 |
| 1,873,451 | McKnight et al. | Aug. 23, 1932 |
| 2,292,446 | Huck | Aug. 11, 1942 |
| 2,445,357 | Korsmo | July 20, 1948 |
| 2,501,576 | Novy | Mar. 21, 1950 |